United States Patent [19]

Kawanabe

[11] Patent Number: 5,232,071
[45] Date of Patent: Aug. 3, 1993

[54] CASTER BRAKE WITH PUSH BUTTON ACTUATION OF A SLIDE MEMBER FOR LOCKING THE CASTER WHEEL

[75] Inventor: Masatoshi Kawanabe, Tokyo, Japan

[73] Assignee: Sugatsune Kogyo Co., Ltd., Tokyo, Japan

[21] Appl. No.: 863,594

[22] Filed: Apr. 3, 1992

[30] Foreign Application Priority Data

May 8, 1991 [JP] Japan .................. 3-41202[U]

[51] Int. Cl.⁵ ............................................. B60B 33/00
[52] U.S. Cl. ..................................... 188/1.12; 188/69; 16/35 R
[58] Field of Search ................ 188/1.12, 69, 19, 20, 188/27, 31, 60, 265; 16/35 R; 74/483 PB

[56] References Cited

U.S. PATENT DOCUMENTS

| | | | |
|---|---|---|---|
| 3,571,842 | 3/1971 | Fricke | 16/35 R |
| 3,772,733 | 11/1973 | Strosberg et al. | 16/35 R |
| 4,479,566 | 10/1984 | Ishii et al. | 188/1.12 |
| 5,181,587 | 1/1993 | Masatoshi | 16/35 R X |

FOREIGN PATENT DOCUMENTS

2054070  2/1981  United Kingdom .............. 188/1.12

*Primary Examiner*—Robert J. Oberleitner
*Assistant Examiner*—Josie A. Ballato
*Attorney, Agent, or Firm*—Wegner, Cantor, Mueller & Player

[57] ABSTRACT

A single wheel-type caster includes a frame having a body portion and a pair of parallel side walls extending downwardly from the body portion. A wheel is disposed between and rotatably supported on the pair of side walls of the frame. A mechanism for locking the wheel includes a group of engagement portions which are provided at the wheel, and are arranged on a circle having its center aligned with the axis of rotation of the wheel. This wheel lock mechanism further includes a push button and a slide member. The push button is disposed in opposed relation to the outer peripheral surface of the wheel, and is supported on the body portion of the frame so as to move radially of the wheel. The slide member has an engagement portion, and is supported on one of the side walls of the frame so as to slide radially of the wheel. The slide member is moved in response to the movement of the push button. When the engagement portion of the slide member is engaged with the engagement portion of the wheel, the wheel is locked.

9 Claims, 5 Drawing Sheets

CASTER BRAKE WITH PUSH BUTTON ACTUATION OF A SLIDE MEMBER FOR LOCKING THE CASTER WHEEL

BACKGROUND OF THE INVENTION

This invention relates to a caster of the single wheel type having a wheel lock function.

U.S. Pat. Nos. 3,571,842 and 3,772,733 disclose lock mechanisms for a single wheel-type caster. This lock mechanism includes a push button, and the push button is operated to move a friction member toward an outer peripheral surface of a wheel, thereby locking the wheel utilizing the friction between the friction member and the outer peripheral surface of the wheel. The push button is held in a wheel-locking position and in a wheel-unlocking position by a hold mechanism. However, since the lock mechanism of this construction depends for its locking function on the frictional force, the locking of the wheel is not entirely satisfactory, and it is difficult to stably stop the wheel.

U.S. Pat. No. 4,479,566 discloses a wheel lock mechanism in a double wheel-type caster. This caster includes a frame having one vertical support wall. A pair of wheels are arranged on the opposite sides of the support wall, respectively, and are rotatably supported by the support wall. The lock mechanism includes a number of engagement recesses formed in each of the pair of wheels, a push button supported on the support wall so as to move radially of the wheels, and a rotor rotatably supported on the push button. The opposite ends of the rotor are engaged respectively in the engagement recesses of the pair of wheels, thereby positively locking the pair of wheels. A hold mechanism for holding the push button includes a cam hole formed in the support wall, and a cam follower formed on the rotor intermediate the opposite ends of this rotor.

In the present invention, the basic principle of the lock mechanism of the above U.S. Pat. No. 4,479,566 is applied to a single wheel-type caster, and the present invention includes various improvements.

SUMMARY OF THE INVENTION

It is an object of this invention to provide a single wheel-type caster which can positively lock a wheel, and is simple in construction.

According to one aspect of the present invention, there is provided a caster comprising:

(a) a frame including a body portion, and a pair of parallel side walls extending downwardly from the body portion;

(b) a wheel disposed between and rotatably supported on the pair of side walls of the frame, the wheel having a number of engagement portions arranged on a circle having its center aligned with an axis of rotation of the wheel;

(c) a push button disposed in opposed relation to an outer peripheral surface of the wheel, the push button being supported on the body portion of the frame so as to move radially of the wheel;

(d) a push button hold mechanism mounted on the body portion of the frame so as to hold the push button in an inward position and in an outward position;

(e) a slide member mounted on one of the side walls of the frame so as to slide radially of the wheel, the slide member having an engagement portion;

(f) a plate disposed between the one side wall and the wheel, the slide member being slidingly moved through the plate in response to the movement of the push button, the engagement portion of the slide member being engaged with one of the engagement portions of the wheel to lock the wheel when the slide member is in a first position corresponding to one of the inward and outward positions of the push button, and the engagement portion of the slide member being disengaged from one of the engagement portions of the wheel to unlock the wheel when the slide member is in a second position corresponding to the other of the inward and outward positions of the push button; and (g) return spring means urging the push button and the slide member outwardly.

According to another aspect of the invention, there is provided a caster comprising:

(a) a frame including a body portion, and a pair of parallel side walls extending downwardly from the body portion;

(b) a wheel disposed between and rotatably supported on the pair of side walls of the frame, the wheel having two groups of engagement portions provided at opposite side portions of the wheel, respectively, and each group of the engagement portions being arranged on a circle having its center aligned with an axis of rotation of the wheel;

(c) a push button disposed in opposed relation to an outer peripheral surface of the wheel, the push button being supported on the body portion of the frame so as to move radially of the wheel;

(d) a push button hold mechanism mounted on the body portion of the frame so as to hold the push button in an inward position and in an outward position;

(e) a pair of slide members mounted respectively on the pair of side walls of the frame so as to slide radially of the wheel, the slide members being slidingly moved in response to the movement of the push button, each of the slide members having an engagement portion, the engagement portion of each of the slide members being engaged with one of the corresponding group of the engagement portions of the wheel to lock the wheel when the slide member is in a first position corresponding to one of the inward and outward positions of the push button, and the engagement portion of the slide member being disengaged from one of the corresponding group of the engagement portions of the wheel to unlock the wheel when the slide member is in a second position corresponding to the other of the inward and outward positions of the push button; and (f) return spring means urging the push button and the pair of slide members outwardly.

DESCRIPTION OF THE PREFERRED EMBODIMENT

One preferred embodiment of the present invention will now be described with reference to the drawings.

Figure 1:
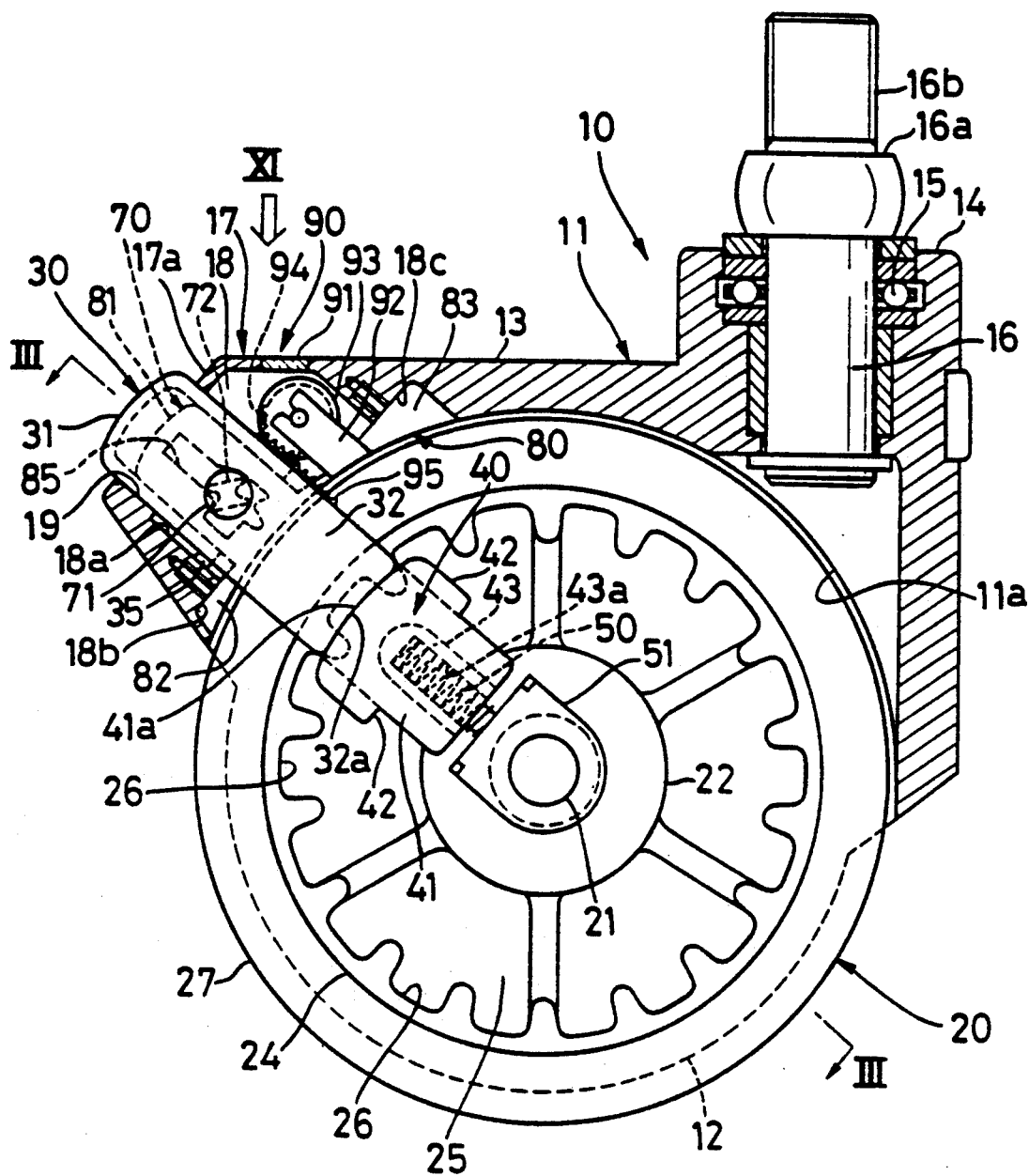
FIG. 1 is a cross-sectional view of a caster of the present invention in an unlocked condition.
Figure 2:
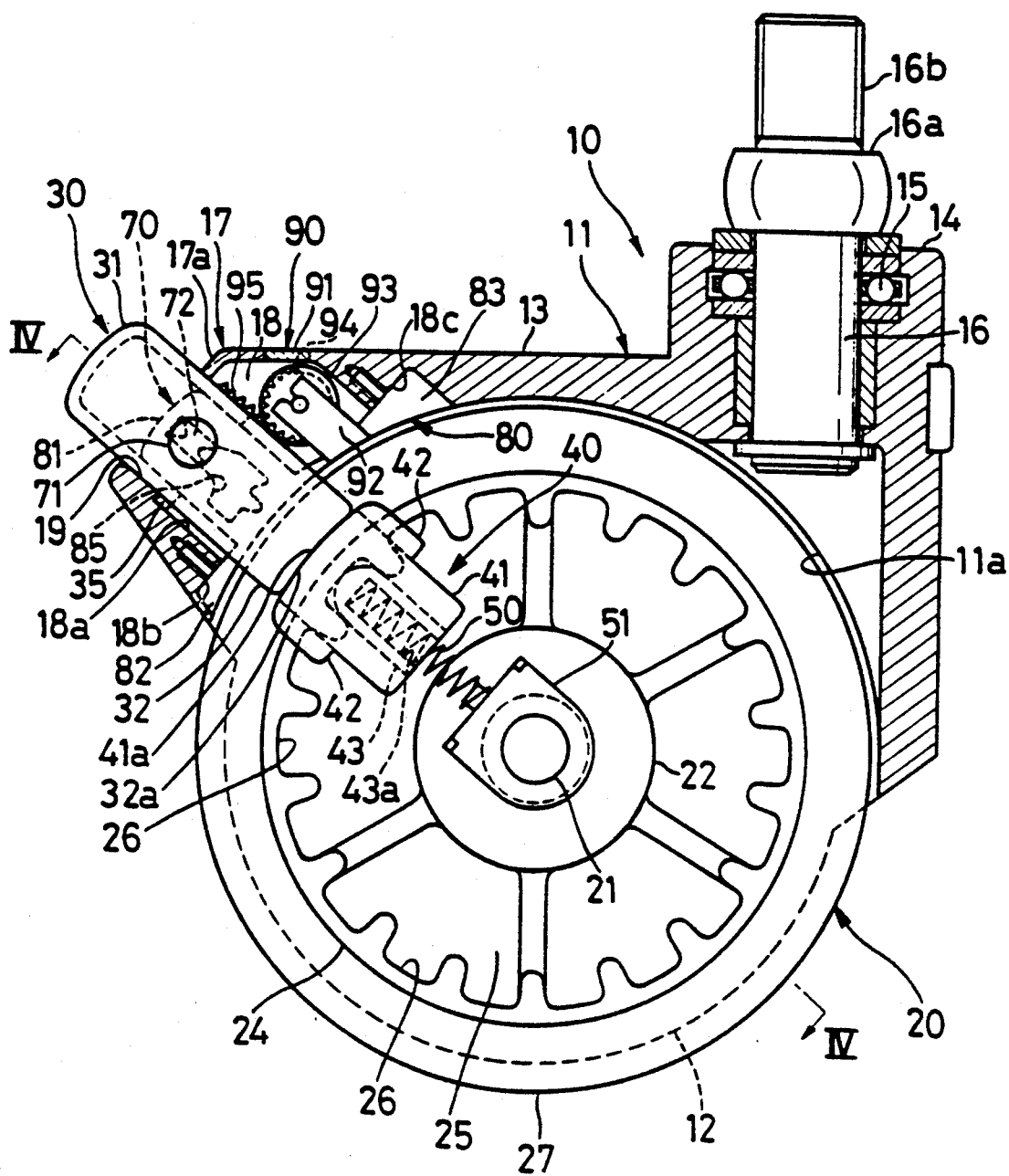
FIG. 2 is a view similar to FIG. 1, but showing a locked condition of the caster.
Figure 3:
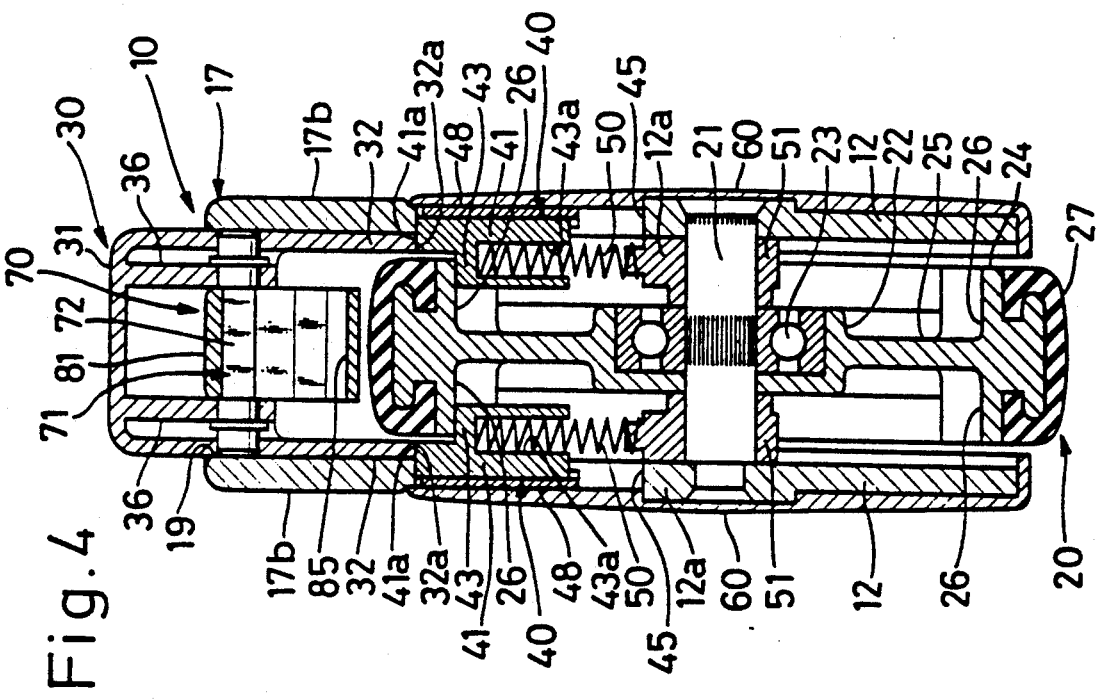
FIG. 3 is a cross-sectional view taken along the line III—III of FIG. 1.
Figure 4:
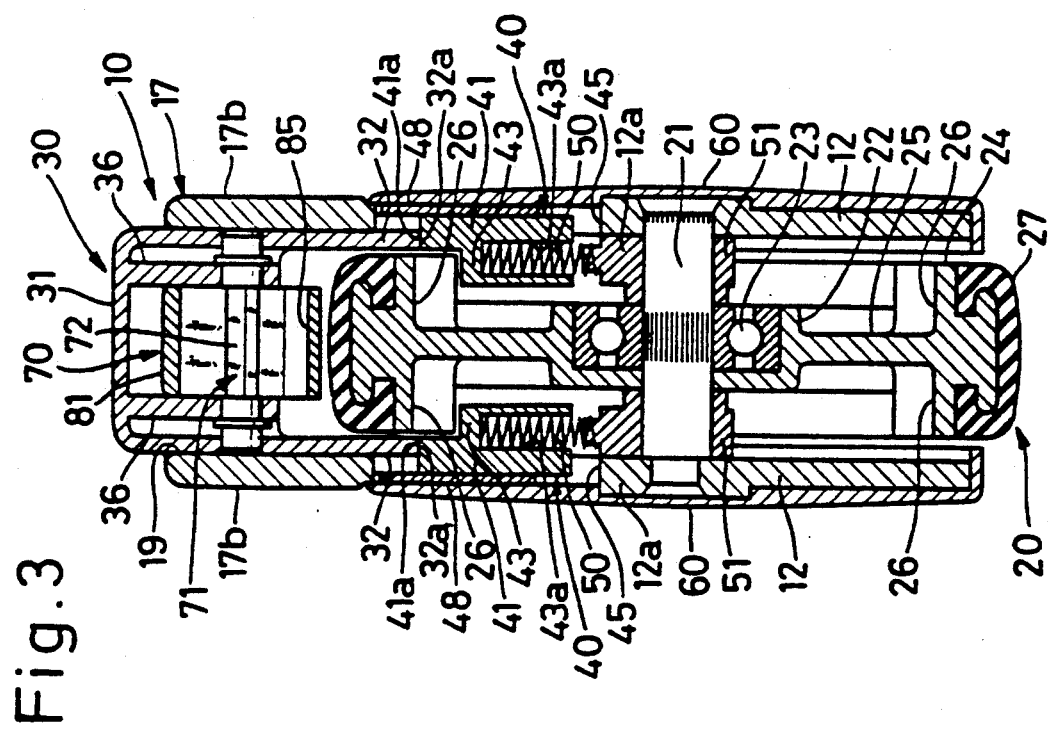
FIG. 4 is a cross-sectional view taken along the line IV—IV of FIG. 2.
Figure 5:
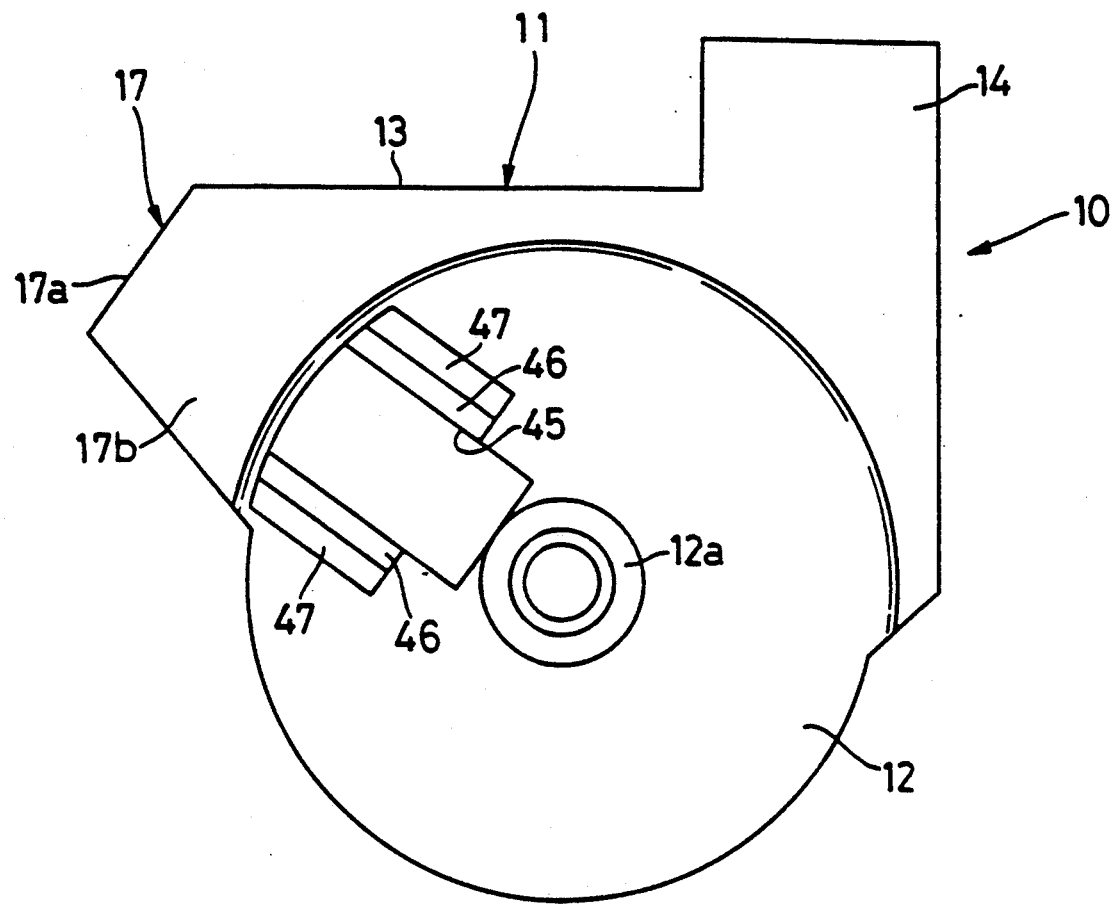
FIG. 5 is a front-elevational view of a frame.

FIGS. 1 and 3 show a caster in an unlocked condition, and FIGS. 2 and 4 show the caster in a locked condition. The caster comprises a frame 10. The frame 10 includes a body portion 11, and a pair of side walls 12 extending vertically downwardly from the body portion 11. The side walls 12 are disposed parallel to each other, and as best shown in FIG. 5, each side wall 12 has a generally disk-shape. As best shown in FIGS. 1 and 2, the body portion 11 of the frame 10 has an upper wall 13 extending generally horizontally, and a boss 14 formed at a rear end portion of the upper wall 13. A vertical mounting rod 16 is rotatably mounted in the boss 14 through a bearing 15. The rod 16 has a larger-diameter portion 16a intermediate the opposite ends thereof, and has a threaded portion 16b at its upper portion. A bracket or a bottom plate of equipment (not shown) rests on the larger-diameter portion 16a, and the threaded portion 16b extends upwardly through this bracket or this bottom plate. By tightening a nut (not shown) threaded on the threaded portion 16b, the caster is attached to the equipment.

As best shown in FIGS. 3 and 4, a single wheel 20 is interposed between the pair of side walls 12, and is rotatably supported on the central portions of these side walls 12. More specifically, bosses 12a are formed at the central portions of the pair of side walls 12, respectively, and a horizontally-extending shaft 21 is fixedly secured at its opposite ends to these bosses 12a. The wheel 20 has a boss 22 at its central portion, and is rotatably mounted on the shaft 21 through a bearing 23 provided in the boss 22. The wheel 20 has a ring 24 disposed in concentric relation to the boss 22, and the ring 24 and the boss 22 are interconnected by a generally disk-shaped rim 25. The outer peripheral edge of the rim 25 is connected to the inner peripheral surface of the ring 24, and is disposed centrally of the width of the ring 24. Two groups of engagement recesses (engagement portions) 26 are formed respectively at the opposite side portions of the inner peripheral surface of the ring 24, each group of the engagement recesses 26 being spaced at equal intervals over the entire circumference of the ring 24. A rubber tire 27 is mounted on the outer peripheral surface of the ring 24. As shown in FIGS. 1 and 2, the body portion 11 of the frame 10 has an inner peripheral surface 11a of an arcuate shape extending along the outer peripheral surface of the wheel 20.

The body portion 11 of the frame 10 has a support portion 17 formed at the front end portion of the upper wall 13. The support portion 17 serves to support a push button 30 (later described), and has a hollow construction. An internal space of the support portion 17 is designated at 18. The internal space 18 is open to the inner peripheral surface 11a of the body portion 11. The support portion 17 has a surface 17a inclined generally at 45°, and a guide hole 19 of a rectangular shape is formed in the inclined surface 17a, and is connected to the internal space 18.

Figure 8:
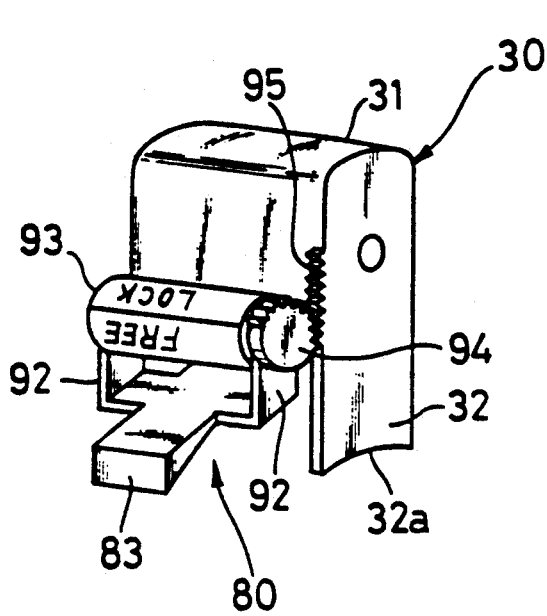
FIG. 8 is a perspective view showing a push button and a molded member in their assembled condition.
Figure 9:
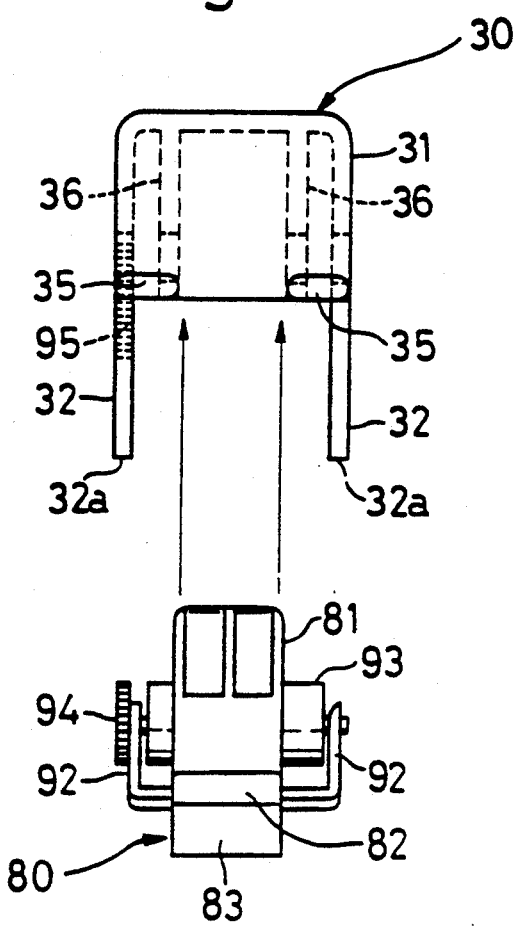
FIG. 9 is a side-elevational view showing the push button and the molded member in their disassembled condition.
Figure 10:
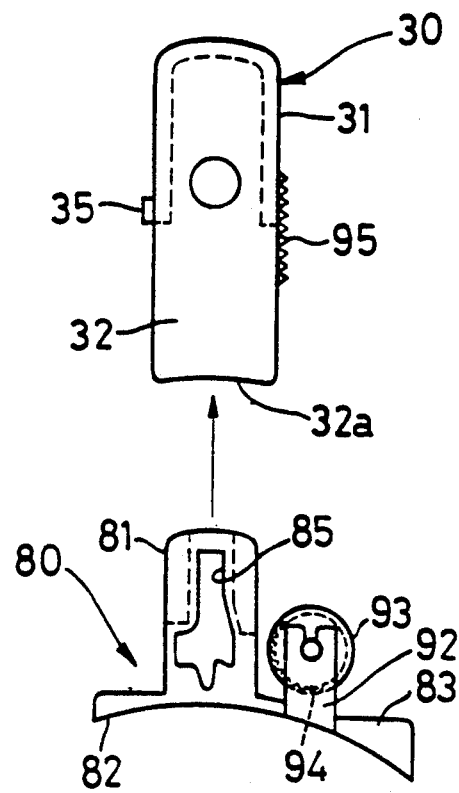
FIG. 10 is a front-elevational view showing the push button and the molded member in their disassembled condition.

As best shown in FIGS. 8 to 10, the push button 30, which is operated so as to lock the wheel 20 and to release the wheel 20, includes a hollow body portion 31 of a rectangular transverse cross-section, and a pair of plate-like legs 32 extending respectively from a pair of opposed side walls of the body portion 31 toward the center of the wheel 20. As shown in FIGS. 3 and 4, the push button 30 is disposed astride the wheel 20, and the body portion 31 is disposed in opposed relation to the outer peripheral surface of the wheel 20, and the pair of legs 32 are disposed on the opposite sides of the wheel 20, respectively. The body portion 31 of the push button 30 is inserted in the guide hole 19, and is supported by the peripheral edge of the guide hole 19 and a pair of side walls 17b of the support portion 17 in such a manner that the body portion 31 is slidable radially of the wheel 20. The pair of side walls 17b are continuous with the pair of side walls 12, respectively, and constitute part of these side walls 12. Each leg 32 is movable in a gap formed between the corresponding side walls 12, 17b and the wheel 20, and is guided by a pair of projections (not shown) which are formed on the inner surface of the corresponding side wall 17b, and extend radially of the wheel 20. A distal end surface 32a (the inner end surface in the radial direction of the wheel 20) of each leg 32 is defined by an arcuate surface, and the center of a circle on which this arcuate surface 32a is disposed coincides with the center of the wheel 20 when the push button 30 is disposed in an outward position later described.

As shown in FIGS. 9 and 10, a pair of stoppers 35 are formed on the outer surface of another side wall of the body portion 31 of the push button 30 at the lower end portion of this side wall. As shown in FIGS. 1 and 2, the stoppers 35 are received in a groove 18a formed in the inner surface of the frame 10 forming the internal space 18, and the stoppers 35 are engageable with the upper end of the groove 18a so as to limit the amount of projection of the push button 30 from the inclined surface 17a.

Figure 6:
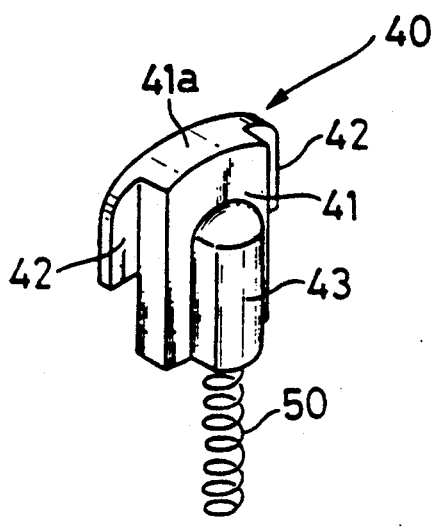
FIG. 6 is a perspective view of a slide member.

The caster further comprises a pair of slide members 40 which are moved in response to the movement of the push button 30 so as to lock and unlock the wheel 20. As best shown in FIG. 6, the slide member 40 includes a plate-like body portion 41 of a generally rectangular shape, a pair of flanges 42 which extend respectively from the opposite side edges of the body portion 41 away from each other in the direction of the circumference of the wheel 20 and are disposed in spaced relation to the wheel 20, and a semi-cylindrical engagement projection (engagement portion) 43 which is formed on that surface of the body portion 41 facing the wheel 20 and extends radially of the wheel 20.

Figure 7:
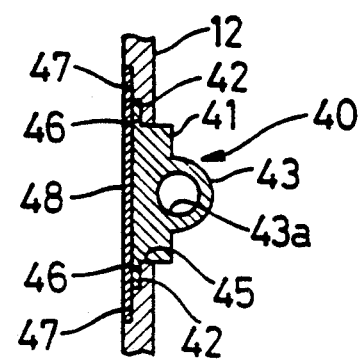
FIG. 7 is a transverse cross-sectional view showing the slide member and a side wall supporting the slide member.

As best shown in FIGS. 5 and 7, a guide hole 45 of a square shape is formed through each of the side walls 12 of the frame 10. A pair of guide grooves 46 are formed in the outer surface of the side wall 12, and are disposed adjacent to the opposite side edges of the guide hole 45, respectively, the guide grooves 46 extending radially of the wheel 20. A pair of mounting grooves 47 are formed in the outer surface of the side wall 12, and are disposed adjacent to the pair of guide grooves 46, respectively. As shown in FIGS. 3, 4 and 7, the body portion 41 of the slide member 40 is received in the guide hole 45, and the pair of flanges 42 are received in the pair of guide grooves 46, respectively. With this arrangement, the slide member 40 is slidable radially of the wheel 20. Opposite side portions of a holder plate 48 are fixedly received respectively in the pair of mounting grooves 47 to prevent the slide member 40 from being disengaged from the side wall 12.

As shown in FIGS. 3 and 4, the slide member 40 is supported on the side wall 12 as described above, and in this condition part of the slide member 40 is projected from the inner surface of the side wall 12 toward the wheel 20, and the distal end surface 32a of the leg 32 of the push button 30 is abutted against a top surface 41a (an outer surface in the radial direction of the wheel 20) of this projected portion. The top surface 41a of the slide member 40 has an arcuate shape having the same curvature as that of the distal end surface 32a of the push button 30. The engagement projection 43 of the slide member 40 is further projected toward the wheel 20. The top (the outer end in the radial direction of the wheel 20) of the engagement projection 43 is semispherical (see FIG. 6).

As best shown in FIGS. 1 to 4, the pair of slide members 40 are urged radially outwardly of the wheel 20 by a pair of return springs 50, respectively. More specifically, a blind hole 43a is formed in the engagement projection 43 of the slide member 40, and extends longitudinally of the engagement projection 43. The return spring 50 is received in the hole 43a with one end thereof abutted against the closed end of the hole 43a, and the other end of the return spring 50 is received by a spring retainer 51 fixedly mounted on the outer periphery of the shaft 21. The pair of slide members 40 are urged radially outwardly of the wheel 20 by the pair of return springs 50, respectively, and the push button 30 is urged radially outwardly of the wheel 20 through the slide members 40. In other words, by the pair of return springs 50, the top surfaces 41a of the pair of slide members 40 are kept engaged respectively with the distal end surfaces 32a of the pair of legs 32 of the push button 30, and therefore the slide members 40 can be moved in response to the movement of the push button 30.

As shown in FIGS. 2 and 4, when each slide member 40 is disposed in a position (outward position) remote from the center of the wheel 20, the top of the engagement projection 43 of the slide member 40 is received or engaged in one of the engagement recesses 26 of the wheel 20, thereby locking the wheel 20. In contrast, as shown in FIGS. 1 and 3, when each slide member 40 is disposed in a position (inward position) close to the center of the wheel 20, the engagement projection 43 is away from the engagement recesses 26, so that the wheel 20 is in an unlocked condition.

As shown in FIGS. 3 and 4, the outer sides of the side walls 12 of the frame 10 supporting the slide members 40 are covered by a cover 60.

A hold mechanism 70 for the push button 30 will now be described. The hold mechanism 70 cooperates with the return springs 50 to hold the push button 30 in the inward position and in the outward position. The construction of the hold mechanism 70 will now be described in detail.

A molded member 80 is received within the internal space 18 of the support portion 17 of the frame 10. As best shown in FIGS. 9 and 10, the molded member 80 comprises a guide member 81, and a pair of brackets 82 and 83 extending from the lower end of the guide member 81 away from each other in the direction of the circumference of the wheel 20. As best shown in FIGS. 1 and 2, the brackets 82 and 83 of the molded member 80 are received respectively in recesses 18b and 18c formed in the inner peripheral surface 11a of the frame 10, and are fixedly secured to the frame 10 by screws. With this arrangement, the guide member 81 is supported on the frame 10. The guide member 81 extends radially outwardly of the wheel 20, and is received between a pair of parallel opposed partition walls 36 provided within the hollow body portion 31 of the push button 30. A cam hole 85 of a special configuration is formed through the guide member 81 in the direction of the axis of rotation of the wheel 20.

Opposite end portions of a rotor 71 are rotatably supported respectively by the pair of partition walls 36 of the body portion 31 of the push button 30 and also by the opposite side walls of the body portion 31 disposed parallel to the partition walls 36, the rotor 71 extending in the direction of the axis of rotation of the wheel 20. That portion of the rotor 71 lying between its opposite end portions has a generally X-shaped cross-section, and serves as a cam follower 72. The cam follower 72 is disposed between the pair of partition walls 36, and extends through the cam hole 85 of the guide member 81.

The cam hole 85 extends radially of the wheel 20. When the push button 30 moves radially of the wheel 20, the cam follower 72 of the rotor 71 makes a predetermined rotational motion in accordance with the profile of the cam hole 85. Since the operation achieved by the cooperation between the cam follower 72 and the cam hole 85 is described in U.S. Pat. No. 4,479,566, a detailed explanation thereof is omitted here.

As described above, the hold mechanism 70 is constituted by the rotor 71 and the guide member 81 which are received in the body portion 31 of the push button 30. Therefore, any space for accommodating the hold mechanism 70 does not need to be provided outside of the push button 30.

Figure 11:
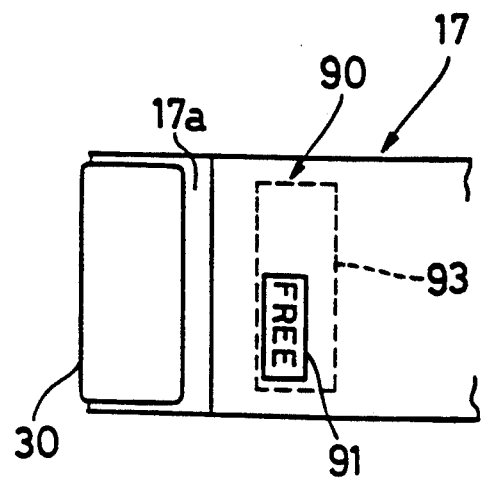
FIG. 11 is a view as seen in a direction XI of FIG. 1, showing a front end portion of the caster.

Reference is now made to a lock display device 90 indicating whether the wheel 20 is in the locked condition or in the unlocked condition. As shown in FIGS. 1, 2 and 11, a transparent plate is fitted in a hole, formed through the horizontal upper wall of the support portion 17 of the frame 10, thereby providing a window 91. A pair of auxiliary brackets 92 extend respectively from the opposite sides of the bracket 83 of the molded member 80 in the radial outward direction of the wheel 20. A roller 93 is rotatably supported on the pair of auxiliary brackets 92, and is disposed parallel to the above-mentioned shaft 21. The roller 93 is received within the internal space 18, and the peripheral surface of the roller 93 is disposed in opposed relation to the window 91. As shown in FIG. 8, a mark "FREE" and a mark "LOCK" are provided on the peripheral surface of the roller 93. A pinion 94 is fixedly mounted on one end of the roller 93. A rack 95 extending radially of the wheel 20 is formed on the outer surface of the push button 30. The rack 95 is in mesh with the pinion 94. With this arrangement, the roller 93 is rotated in response to the movement of the push button 30.

As later described, when the push button 30 as well as the slide members 40 is in the outward position to lock the wheel 20, the mark "LOCK" can be viewed through the window 91. When the push button 30 as well as the slide members 40 is in the inward position to unlock the wheel 20, the mark "FREE" can be viewed through the window 91.

Next, in the caster of the above construction, the locking of the wheel 20 and the release of the wheel 20 will now be described. For bringing the wheel 20 from the locked condition (FIGS. 2 and 4) into the freely-rotatable condition, the outwardly-projecting push button 30 is pushed inwardly against the bias of the return springs 50. By doing so, the cam follower 72 of the rotor 71 supported by the push button 30 is brought into engagement with the lower end of the cam hole 85 of the guide member 81, and is held in a predetermined angular position. Then, when the push button 30 is released, the push button 30 as well as the rotor 71 is slightly moved radially outwardly of the wheel 20 under the influence of the return springs 50. At this time, however, as shown in FIGS. 1 and 3, the cam follower 72 is not returned to the upper end of the cam hole 85, but is engaged with the intermediate portion of the cam hole 85, and therefore the push button 30 is held in the inward position. In response to the movement of the push button 30, the slide members 40 first move radially inwardly of the wheel 20, and then are slightly returned radially outwardly to the inward position, and are held in this inward position. As a result, as shown in FIGS. 1 and 3, since the engagement projection 43 of each slide member 40 is disengaged from the engagement recess 26, the wheel 20 can rotate freely.

For bringing the wheel 20 from the unlocked condition (FIGS. 1 and 3) into the locked condition, the push button 30 held in the inward position is again pushed inwardly. By doing so, the cam follower 72 of the rotor 71 is brought into engagement with the lower end of the cam hole 85 of the guide member 81, and is held in a predetermined angular position different from the above-mentioned angular position. Then, when the push button 30 is released, the push button 30 as well as the rotor 71 is moved radially outwardly of the wheel 20 under the influence of the return springs 50. At this time, as shown in FIGS. 2 and 4, since the cam follower 72 is returned to the upper end of the cam hole 85, the push button 30 is held in the outward position. In response to the movement of the push button 30, the slide members 40 first move radially inwardly of the wheel 20, and then move radially outwardly of the wheel 20. As a result, as shown in FIGS. 2 and 4, the top of the engagement projection 43 of each slide member 40 is engaged or received in the engagement recess 26 of the wheel 20, thereby locking the wheel 20.

In the above locked condition, the cam follower 72 may be slightly spaced apart from the upper end of the cam hole 85, and the stoppers 35 may be slightly spaced apart from the upper end of the groove 18a within the range of an allowable backlash or play of the push button 30. In the locked condition, the stoppers 35 of the push button 30 may be abutted against the upper end of the groove 18a to hold the push button 30 in the outward position, and the cam follower 72 may be slightly spaced apart from the upper end of the cam hole 85. In this case, the stoppers 35 and the groove 18a also serve as part of the hold mechanism 70.

As described above, the wheel 20 is positively locked by engaging the engagement projections 43 of the slide members 40 (which are supported respectively on the side walls 12 of the frame 10) in the engagement recesses 26 of the wheel 20, respectively. And besides, since the opposite side portions of the wheel 20 are locked, the positively firmly-locked condition can be obtained.

In this embodiment, the slide members 40 are separate from the push button 30, and therefore even when trying to forcibly rotate the locked wheel 20 inadvertently, this force is transmitted only as far as the slide members 40, and is not transmitted to the push button 30. Therefore, an undue force will not be exerted on the push button 30, and there is no possibility of damaging the push button 30 and the hold mechanism 70.

The locking of the wheel 20 at the opposite side portions thereof, as well as the release of this locking, is done by operating the single push button 30 received in the body portion 11 of the frame 10, and therefore the construction is simple. Further, only the slide members 40 and the return springs 50 are mounted as the lock means on the side walls 12, and therefore the width of the caster is not unduly increased.

The present invention is not limited to the above embodiment, and various modifications can be made. For example, instead of the pair of legs formed on the push button, a projection extending radially outwardly of the wheel may be formed on each of the slide members. In this case, the distal end (the outer end in the radial direction of the wheel) of this projection is abutted against the inner end of the push button in the radial direction of the wheel.

The push button and the pair of slide members may be urged by three return springs, respectively.

The push button may be formed integrally with the slide members. In this case, the push button may be urged directly by a single return spring.

Only one slide member may be used. In this case, a group of engagement recesses are provided at the wheel, and one leg is formed on the push button.

The wheel may be locked in the inward position of the slide members, and may be unlocked in the outward position of the slide members. In this case, each group of engagement recesses are arranged on a circle far smaller than the outer peripheral edge of the wheel, and the engagement recesses are open radially outwardly of the wheel.

What is claimed is:
1. A caster comprising:
(a) a frame including a body portion, and a pair of parallel side walls extending downwardly from said body portion;
(b) a wheel disposed between and rotatably supported on said pair of side walls of said frame, said wheel having a number of engagement portions arranged on a circle having its center aligned with an axis of rotation of said wheel;
(c) a push button disposed in opposed relation to an outer peripheral surface of said wheel, said push button being supported on said body portion of said frame so as to move radially of said wheel;
(d) a push button hold mechanism mounted on said body portion of said frame so as to hold said push button in an inward position and in an outward position;
(e) a slide member mounted on one of said side walls of said frame so as to slide radially of said wheel, said slide member having an engagement portion;
(f) a plate disposed between said one side wall and said wheel, said slide member being slidingly moved through said plate in response to the movement of said push button, said engagement portion of said slide member being engaged with one of said engagement portions of said wheel to lock said wheel when said slide member is in a first position corresponding to one of said inward and outward positions of said push button, and said engagement portion of said slide member being disengaged from one of said engagement portions of said wheel to unlock said wheel when said slide member is in a second position corresponding to the other of said inward and outward positions of said push button; and (g) return spring means urging said push button and said slide member outwardly.

2. A caster according to claim 1, in which said return spring means comprises a return spring substantially supported on said one side wall of said frame so as to urge said slide member radially outwardly of said wheel, a force of said return spring being transmitted to said push button via said slide member and said plate.

3. A caster according to claim 2, in which said plate is formed integrally with said push button, and extends from said push button radially inwardly of said wheel, a distal end of said plate being abutted against an outer end of said slide member in a radial direction of said wheel.

4. A caster comprising:
(a) a frame including a body portion, and a pair of parallel side walls extending downwardly from said body portion;
(b) a wheel disposed between and rotatably supported on said pair of side walls of said frame, said wheel having two groups of engagement portions provided at opposite side portions of said wheel, respectively, and each group of said engagement portions being arranged on a circle having its center aligned with an axis of rotation of said wheel;
(c) a push button disposed in opposed relation to an outer peripheral surface of said wheel, said push button being supported on said body portion of said frame so as to move radially of said wheel;
(d) a push button hold mechanism mounted on said body portion of said frame so as to hold said push button in an inward position and in an outward position;
(e) a pair of slide members mounted respectively on said pair of side walls of said frame so as to slide radially of said wheel, said slide members being slidingly moved in response to the movement of said push button, each of said slide members having an engagement portion, said engagement portion of each of said slide members being engaged with one of the corresponding group of said engagement portions of said wheel to lock said wheel when said slide member is in a first position corresponding to one of said inward and outward positions of said push button, and said engagement portion of said slide member being disengaged from one of the corresponding group of said engagement portions of said wheel to unlock said wheel when said slide member is in a second position corresponding to the other of said inward and outward positions of said push button; and (f) return spring means urging said push button and said pair of slide members outwardly.

5. A caster according to claim 4, in which said push button is separate from said pair of slide members.

6. A caster according to claim 5, in which said return spring means comprises a pair of return springs substantially supported on said pair of side walls of said frame so as to respectively urge said pair of slide members radially outwardly of said wheel, outer ends of said slide members in a radial direction of said wheel being abutted against an inner end of said push button in the radial direction of said wheel, so that forces of said return springs being transmitted to said push button via said slide members.

7. A caster according to claim 6, in which said push button has a pair of legs extending radially inwardly of said wheel, a distal end of each of said legs serving as an inner end of said push button in the radial direction of said wheel, and being movable in a space between said wheel and a corresponding one of said pair of side walls of said frame.

8. A caster according to claim 4, in which said push button is hollow, said push button hold mechanism being substantially received within said push button.

9. A caster according to claim 8, in which said push button hold mechanism comprises a guide member and an elongate rotor, said guide member being received within said push button, said guide member having a cam hole formed therethrough in the direction of the axis of rotation of said wheel, an inner end of said guide member in the radial direction of said wheel being supported on said body portion of said frame through a pair of brackets formed on said inner end of said guide member, said rotor extending in the direction of the axis of rotation of said wheel, said rotor being rotatably supported at its opposite end portions on said push button, that portion of said rotor intermediate the opposite end portions thereof being received in said cam hole so as to serve as a cam follower, and said push button being held in at least one of said inward and outward positions through the cooperation between said cam hole and said cam follower.

* * * * *